(12) United States Patent
Hayashi

(10) Patent No.: US 6,191,845 B1
(45) Date of Patent: Feb. 20, 2001

(54) DISTANCE MEASURING APPARATUS AND METHOD

(75) Inventor: Kazuyoshi Hayashi, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/382,075

(22) Filed: Aug. 24, 1999

(30) Foreign Application Priority Data

Sep. 2, 1998 (JP) .................................................. 10-248078
Aug. 19, 1999 (JP) .................................................. 11-232108

(51) Int. Cl.$^7$ ....................................................... G01C 3/00
(52) U.S. Cl. ............................. 356/3; 356/3; 356/4; 356/5
(58) Field of Search .................. 356/3, 4, 4.5, 5, 356/17

(56) References Cited

U.S. PATENT DOCUMENTS 5,576,975 * 11/1996 Sasaki et al. ............................. 356/3
5,699,280 * 12/1997 Oda et al. ................................. 356/3

* cited by examiner

Primary Examiner—Frank G. Font
Assistant Examiner—Reginald A. Ratliff
(74) Attorney, Agent, or Firm—Limbach & Limbach L.L.P.

(57) ABSTRACT

The invention intends to precisely measure the distance to an object. A CCD opens an electronic shutter for a proper period of time under control of a timing generator to receive a laser beam reflected by an object, converts the amount of light entering the CCD during that period of time, after passing a corresponding beam splitter, into an electric signal (voltage), and then outputs the electric signal to a distance calculating circuit. The distance calculating circuit calculates the distance from a laser telemeter to the object using a dark voltage $V_D$, a reflection voltage $V_R$ and a total voltage $V_A$ inputted from the CCD.

19 Claims, 9 Drawing Sheets

DISTANCE MEASURING APPARATUS AND METHOD

BACKGROUND OF THE INVENTION

1. Field of the Invention

The present invention relates to a distance measuring apparatus and method, as well as an offerable medium for providing program code to implement the apparatus and method. More particularly, the present invention relates to a distance measuring apparatus and method for measuring the distance to an object based on a reflected beam from the object.

2. Description of the Related Art

A distance measuring method is known with which the distance to an object is measured by irradiating a laser beam to the object and measuring a time from the emission of the laser beam to the arrival of a reflected beam. There is also known another distance measuring method of measuring the amount of a laser beam reflected by an object and determining the distance to the object, as disclosed in PCT International Publications WO97/0111, WO97/0112 and WO97/0113, for example.

With the above latter related art, however, it is difficult to achieve precise measurement of the distance because the reflectivity of the object for the laser beam is not taken into consideration.

The above former related art has a problem as follows. When measuring the distance to an object having a predetermined size, the laser beam requires to be scanned over the whole of the object. Accordingly, the time at which the distance is measured differs for each point on the object, and therefore the distance to a moving object cannot be precisely measured.

SUMMARY OF THE INVENTION

The present invention has been made in view of the state of art set forth above, and intends precise measurement of the distance, taking into account the reflectivity of an object for a laser beam.

The present invention provides a distance measuring apparatus for measuring the distance to an object using a laser beam, the apparatus comprising laser beam emitting means for emitting a laser beam; light receiving means comprising at least one light receiving device for receiving the laser beam reflected by the object; control means for controlling the laser beam emitting means to emit the laser beam, and controlling the light receiving means to receive the laser beam reflected by the object during a first period of time and to receive the laser beam reflected by the object during a second period of time; and calculating means for producing a measured value corresponding to the amount of light received during the first period of time and a reference value corresponding to the amount of light received during the second period of time, normalizing the measured value with the reference value, and calculating the distance to the object based on the normalized measured value.

Also, the present invention provides a distance measuring method for measuring the distance to an object using a laser beam, the method comprising the steps of a laser beam emitting step of controlling a laser beam emitting unit to emit a laser beam; a first light receiving step of making control to receive the laser beam reflected by the object during a first period of time by a light receiving unit comprising at least one light receiving device; a second light receiving step of making control to receive the laser beam reflected by the object during a second period of time by the light receiving unit; and a calculating step of producing a measured value corresponding to the amount of light received during the first period of time and a reference value corresponding to the amount of light received during the second period of time, normalizing the measured value with the reference value, and calculating the distance to the object based on the normalized measured value.

DESCRIPTION OF THE PREFERRED EMBODIMENTS

Figure 1:
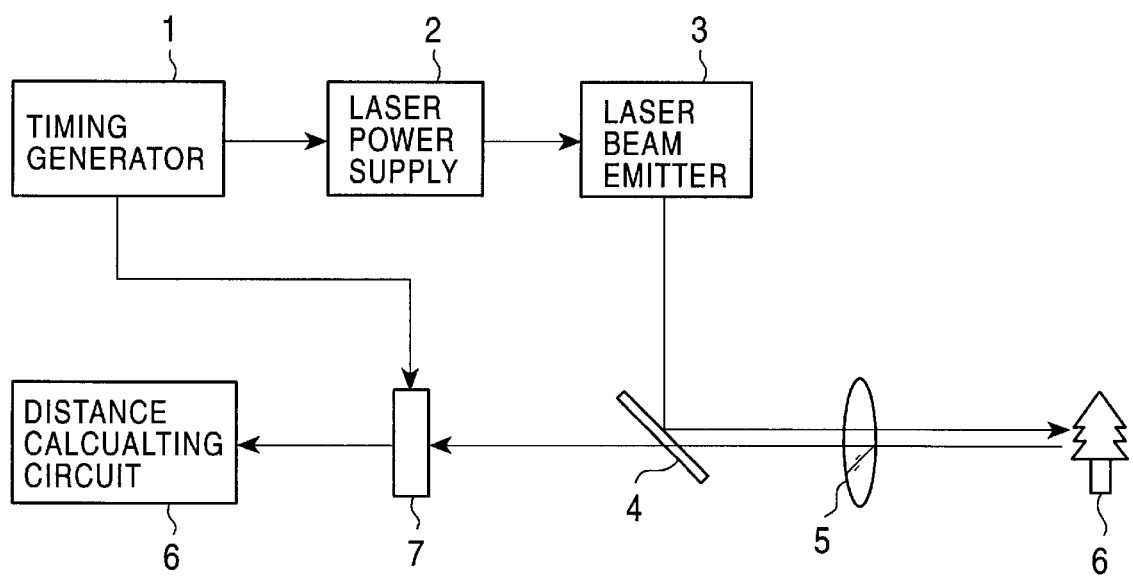
FIG. 1 is a block diagram showing a construction of a laser telemeter.
Figure 2:
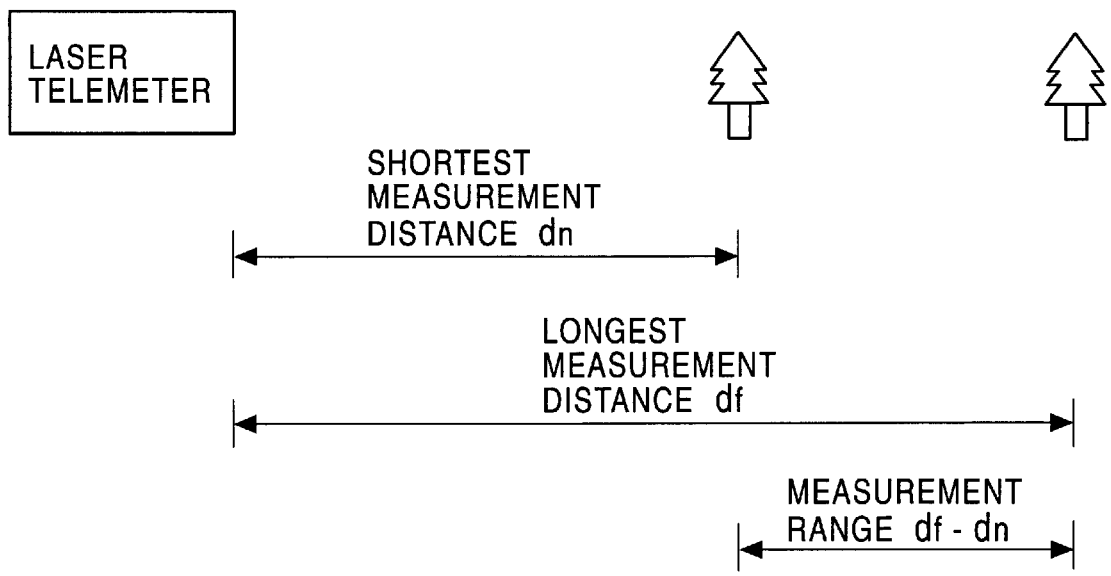
FIG. 2 is a representation for explaining the measurement range of the laser telemeter.

The construction of a laser telemeter, to which the present invention is applied, will be described with reference to FIG. 1. A timing generator 1 controls the timings at which a laser power supply 2 and a CCD image pickup device (referred to simply as a CCD hereinafter) 7 are operated (the timings will be described in detail later). The laser power supply 2 supplies power to a laser beam emitter 3 under control of the timing generator 1. The laser beam emitter 3 emits a laser beam with the power supplied from the laser power supply 2.

The emitted laser beam is reflected by a beam splitter 4 and irradiated to an object 6 through a lens 5. The laser beam reflected by the object 6 returns to the beam splitter 4 through the lens 5, and then enters the CCD 7 after passing the beam splitter 4.

The CCD 7 is made up of optoelectronic transducers arranged into a two-dimensional array, and operates an electronic shutter at the timing determined under control of the timing generator 1. The CCD 7 converts the amount of light, that is incident upon the same while the electronic shutter is opened, into an electric signal (through optoelectronic conversion), and outputs the electric signal to a distance calculation circuit 8. Based on the electric signal inputted from the CCD 7, the distance calculation circuit 8 calculates the distance from the laser telemeter to the object 6.

The laser telemeter is adapted to measure the distance to the object which is positioned within the measurement range from the shortest measurement distance dn to the longest measurement distance df. The following description is made of an example in which the shortest measurement distance dn is set to 20 m and the longest measurement distance df is set to 30 m.

Figure 3A:
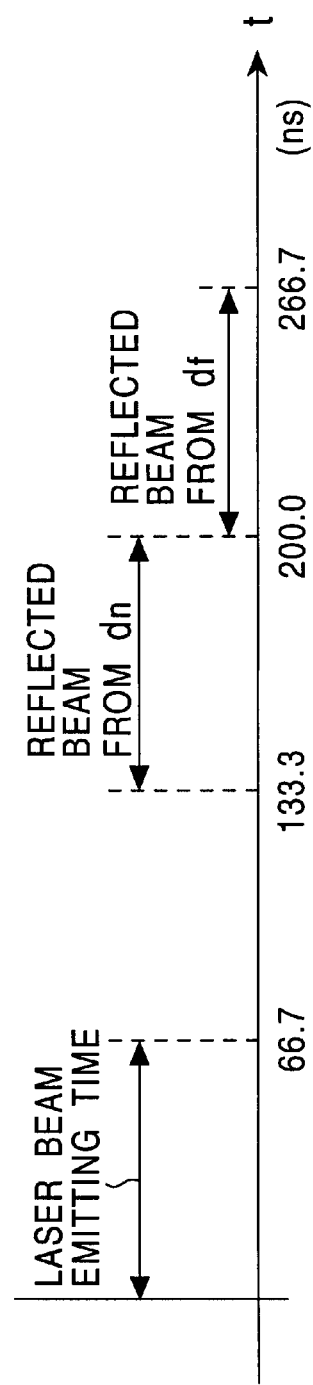
FIGS. 3A and 3B are charts for explaining control made by a timing generator.
Figure 3B:
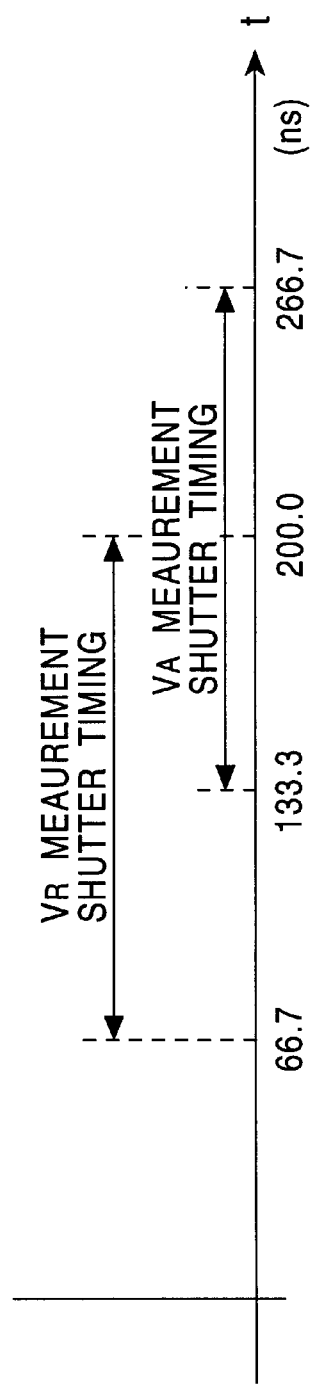

FIGS. 3A and 3B show the timings at which the timing generator 1 controls the operation of the laser power supply 2 and the CCD 7. The timing to control the laser power supply 2, i.e., a period of time (emitting time Tl) during which the laser beam emitter 3 emits the laser beam, is set to be equal to or longer than the time required for the laser beam to go and return through the measurement range, as expressed by the following formula (1), in order that the distance to the object is calculated based on the amount of light received by the CCD 7 within a predetermined period, as described later;

$$Tl \geq \frac{2(df - dn)}{c} \qquad (1)$$

where c is the velocity of light.

In this example, because the velocity of light c is $3 \times 10^8$ (m/s), the laser beam emitting time Tl is given by 66.7 ($=(30-20) \times 2/(3 \times 10^8)$) ns (nanoseconds).

Assuming now that when the emitted laser beam is reflected by the object positioned at the distance d, the time required for the leading end of the reflected beam arrives the CCD 7 is a reflected-beam reception start time Tds, the time required for the tailing end of the reflected beam arrives the CCD 7 is a reflected-beam reception end time Tde, and the laser emission start time is the reference time t=0, a return time t of the laser beam is expressed by the following formula (2):

$$Tds < t < Tde \qquad (2)$$

where $$Tds = \frac{2d}{c} \qquad (3)$$

$$Tde = \frac{2d}{c} + Tl \qquad (4)$$

As shown in FIG. 3A, when the laser beam emitted for the time Tl (66.7 ns) is reflected by the object positioned at the shortest measurement distance dn, the return time of the reflected beam is expressed as follows based on the formula (2) by putting d=dn therein:

$$Tdns < t < Tdne \qquad (5)$$

where $$Tdns = \frac{2dn}{c} \qquad (6)$$

$$Tdne = \frac{2dn}{c} + Tl \qquad (7)$$

When the laser beam emitted for Tl=66.7 ns is reflected by the object positioned at the distance dn=20 (m), the reflected beam returns to the laser telemeter within the time range of 133.3 ns<t<200.0 ns based on the formula (5).

Also, as shown in FIG. 3A, when the laser beam emitted for the time Tl (66.7 ns) is reflected by the object positioned at the longest measurement distance df, the return time of the reflected beam is expressed as follows based on the formula (2) by putting d=df therein:

$$Tdfs < t < Tdfe \qquad (8)$$

where $$Tdfs = \frac{2df}{c} \qquad (9)$$

$$Tdfe = \frac{2df}{c} + Tl \qquad (10)$$

When the laser beam emitted for Tl=66.7 ns is reflected by the object positioned at the distance df=30 (m), the reflected beam returns to the laser telemeter within the time range of 200.0 ns<t<266.7 ns based on the formula (8).

Accordingly, the reflected beam from the object positioned within the measurement range returns to the laser telemeter during the time Tl within Tdns<t<Tdfe. In other words, the laser beam emitted for Tl=66.7 ns returns to the laser telemeter during a period of 66.7 ns within the time range of 133.3 ns<t<266.7 ns depending on the distance to the object. Here, by generalizing a time length (maximum measurement time Tmax) during which the reflected beam from the object positioned within the measurement range possibly returns, Tmax can be expressed by the following formula (11) based on the reflected-beam reception end time for d=df and the reflected-beam reception start time for d=ds:

$$T\max = Tdfe - Tdns = \left(\frac{2df}{c} + Tl\right) - \frac{2dn}{c} \qquad (11)$$

In the case of Tl=2(df−dn)/c in the formula (1), the above formula (11) is rewritten to the following formula (12):

$$T\max = \frac{4(df - dn)}{c} \qquad (12)$$

Since the laser beam emitting time is set to be equal to or longer than the time required for the laser beam to go and return through the measurement range as shown in the formula (1), the CCD 7 receives the reflected beam in amount corresponding to the position (distance) of the object and generates a voltage corresponding to the amount of the received beam (i.e., the period during which the beam is received) when the shutter of the CCD 7 is operated (opened) for the time range of Tdns<t Tdfs (133.3 ns<t<200.0 ns). Stated otherwise, when the object is positioned at the shortest measurement distance dn, the reflected beam is received during the overall period of the shutter operation. When the object is positioned at a middle point between the shortest measurement distance dn and the longest measurement distance df, the reflected beam is received during a half the period of the shutter operation. When the object is positioned at the longest measurement distance df, the reflected beam is hardly received during the period of the shutter operation.

Here, by generalizing the shutter operation time of the CCD 7, the shutter operation start time Ts and the shutter operation end time Te can be expressed by the following formulae (13) and (14), respectively:

$$Ts \leq \frac{2dn}{c} \qquad (13)$$

$$Te = \frac{2df}{c} \qquad (14)$$

Besides, the amount of the reflected beam, which is actually received, depends on not only the period of receiving the beam but also the intensity of the received beam, and the intensity of the reflected beam is affected by the reflectivity of the object. To compensate the effect of the reflectivity, an output voltage (reflection voltage) $V_R$ resulted when the reflected beam is received during a predetermined period is normalized with an output voltage (total voltage) $V_A$ resulted when the reflected beam of the emitted laser beam is received during the overall period. For measuring the total voltage $V_A$, as shown in FIG. 3B, the shutter of the CCD 7 requires to be operated during at least the period Tmax of Tdns<t<Tdfe from the start of receiving the reflected beam from the shortest measurement distance dn to the end of receiving the reflected beam from the longest measurement distance df, i.e., during the period of 133.3 ns given by 133.3 ns<t<266.7 ns.

However, if the shutter operation time differs in duration between the case of measuring the total voltage $V_A$ and the reflection voltage $V_R$, control of the shutter operation is complicated. For this reason, the shutter operation time for measuring the reflection voltage $V_R$ is set to be equal in duration to that for measuring the total voltage $V_A$.

$$T's = Te - T\max = \frac{2dn}{c} - Tl \quad (15)$$

Based on the formula (15), the shutter operation start time is set earlier by the laser beam emitting time Tl so that the shutter is operated during a period of 133.3 ns given by 66.7 ns<t<200.0 ns.

Figure 4:
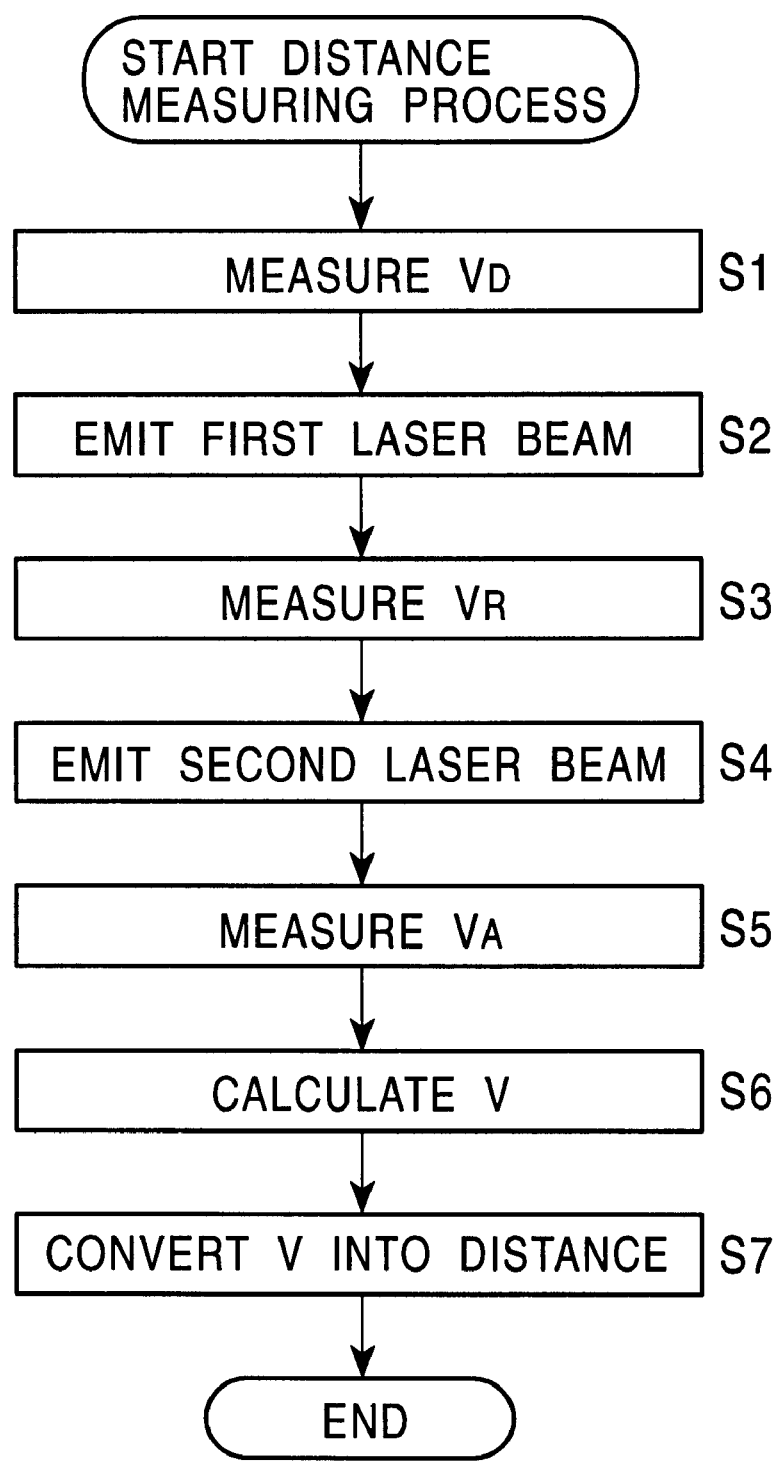
FIG. 4 is a flowchart for explaining the operation of the laser telemeter shown in FIG. 1.

The distance measuring process executed by the laser telemeter will be next described with reference to a flowchart of FIG. 4. In the following description, practical values resulted in the case of dn=20 (m), df=30 (m), c=3×10⁸ (m/s), and Tl=2(df-dn)/c are denoted in parentheses.

When the user sets the laser telemeter toward the object 6 to be measured for the distance to the same and instructs the start of measurement, a dark voltage $V_D$ is measured in step S1 for use in compensation of the effect due to environment light (ambient light) other than the laser beam. More specifically, as shown in FIG. 5, the CCD 7 operates the shutter under control of the timing generator 1 for a period from t=-Tmax (-133.3 ns) immediately before the emission start time (t=0) of a first laser beam (described later) to t=0 (the period being expressed by -Tmax<t<0 hereinafter), converts the amount of light received during that period into a voltage (referred to as a dark voltage $V_D$), and then outputs the dark voltage $V_D$ to the distance calculating circuit 8.

In step S2, the timing generator 1 controls the laser power supply 2 and supplies power to the laser beam emitter 3. As shown in FIG. 5, the laser beam emitter 3 emits the first laser beam during a period of 0<t<Tl (0<t<66.7 ns). The laser beam is reflected by the beam splitter 4 and irradiated to the object 6 through the lens 5. The laser beam reflected by the object 6 returns to the beam splitter 4 through the lens 5, and then enters the CCD 7 after passing the beam splitter 4. The reflected beam returns to the CCD 7 during the predetermined period Tl (66.7 ns) within the range of Tdns<t<Tdfe (133.3 ns<t<266.7 ns).

Figure 5:
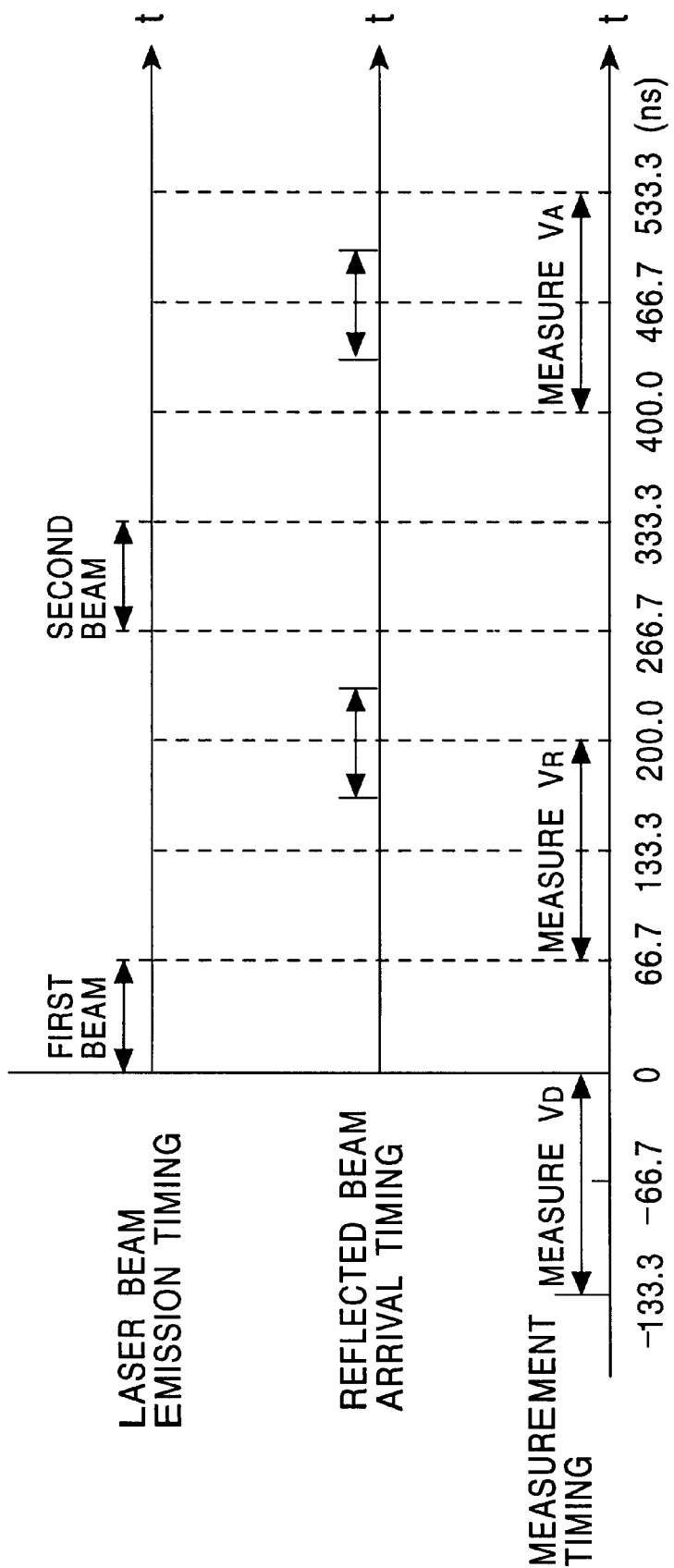
FIG. 5 is a chart for explaining the operation of the laser telemeter shown in FIG. 1.

In step S3, under control of the timing generator 1, the CCD 7 operates the shutter during a period of Tdfs-Tl<t<Tdfs (66.7 ns<t<200.0 ns), as shown in FIG. 5. Accordingly, the amount of light received by the CCD 7 corresponds to the position of the object 6. Then, the CCD 7 converts the amount of light received during that period into an electric signal (reflection voltage $V_R$), and outputs the reflection voltage $V_R$ to the distance calculating circuit 8.

In step S4, the timing generator 1 controls the laser power supply 2 and supplies power to the laser beam emitter 3 for the second time. Here, the time of each process in emitting a second laser beam is calculated on the basis of t=Tdfe. As shown in FIG. 5, the laser beam emitter 3 emits the second laser beam during a period of Tdfe<t<Tdfe+Tl (266.7 ns<t<333.3 ns). Since the reflected beam from the distance df possibly returns until the time Tdfe (266.7 ns) as mentioned above, the second laser beam is emitted after Tdfe (266.7 ns). The laser beam reflected by the object 6 enters the CCD 7 during the predetermined period Tl (66.7 ns) after Tdns (133.3 ns) from the emission of the second laser beam, i.e., within the range of Tdfe+Tdns<t<Tdfe+Tdfe (400.0 ns<t<533.3 ns).

In step S5, under control of the timing generator 1, the CCD 7 operates the shutter during a period of Tdfe+Tdns<t<Tdfe+Tdfe (400.0 ns<t<533.3 ns), as shown in FIG. 5. Accordingly, the CCD 7 can receive the laser beam reflected by the object at any timing, i.e., at any position within the overall measurement range. Then, the CCD 7 converts the amount of light received during that period into an electric signal (total voltage $V_A$), and outputs the total voltage $V_A$ to the distance calculating circuit 8.

In step S6, the distance calculating circuit 8 subtracts the dark voltage $V_D$ from each of the reflection voltage $V_R$ and the total voltage $V_A$, as shown in the following formula, for compensating the effect of the environment light. The compensated reflection voltage $(V_R-V_D)$ is further compensated by multiplying a coefficient Ct to compensate a difference between the maximum amount of light receivable in measuring the reflection voltage $V_R$ and the maximum amount of light receivable in measuring the total voltage $V_A$. The thus-compensated reflection voltage Ct $(V_R-V_D)$ is divided by the compensated total voltage $(V_A-V_D)$ for normalization, thereby calculating a compensated normalized reflection voltage V:

$$V = \frac{Ct(V_R - V_D)}{(V_A - V_D)} \quad (16)$$

where $$Ct = \frac{Tl}{(Tdfs - Tdns)} \quad (17)$$

The compensation coefficient Ct shown in the formula (17) will now be described. As mentioned above, the compensation coefficient Ct represents a difference between the maximum amount of light receivable in measuring the reflection voltage $V_R$ and the maximum amount of light actually receivable in measuring the total voltage $V_A$.

In measuring the total voltage $V_A$, the shutter of the CCD 7 is opened during the period of time enough to receive all the laser beam reflected by the object at any position within the measurement range, including the reflected beam from the distance dn and the reflected beam from the distance df, as shown in FIGS. 3A and 3B. The duration of the reflected beam, received during the period of time in which the shutter is opened, is Tl. On the other hand, in measuring the reflection voltage $V_R$, the shutter of the CCD 7 is controlled to be open so that the laser beam reflected by the object is received in amount corresponding to the distance to the object. Accordingly, the reflected beam is received only during the time of Tdns<t<Tdfs after the emission of the laser beam. Thus, in measuring the reflection voltage $V_R$, the CCD 7 can receive only the reflected beam during the time of Tdfs-Tdns, i.e., during the period covering the laser beam reflected by the object at the distance dn at maximum.

If the laser beam emitting time Tl expressed by the above formula (1) is set to be longer than the time required for the laser beam to go and return through the measurement range, Tdfe–Tdns<Tl holds. During the shutter opening time of the CCD 7 in measuring the reflection voltage $V_R$, therefore, the CCD 7 cannot receive all of the reflected beam from the object at any distance within the measurement range.

Namely, the compensation coefficient Ct is a ratio between maximum periods of time during which the reflected beam is receivable, the ratio being used to compensate the difference between the maximum amounts of light receivable in measuring the reflection voltage and the total voltage. When the laser beam emitting time Tl is equal to the time required for the laser beam to go and return through the measurement range, Tdfe–Tdns=Tl holds and therefore the CCD 7 can receive all of the reflected beam from the object at the distance dn.

The compensated normalized reflection voltage V thus determined is proportional to the distance D between the laser telemeter and the object 6. For example, the compensated normalized reflection voltage V=1 represents the distance D=the shortest measurement distance dn and the compensated normalized reflection voltage V=0 represents the distance D=the longest measurement distance df.

In step S7, the distance calculating circuit 8 calculates the distance D from the compensated normalized reflection voltage V as expressed by the following formula (18):

$$D = df - V(df - dn) \tag{18}$$

Incidentally, the measurement of the dark voltage $V_D$ in step S1 may be performed during a period of 2 Tdfe<t<2 Tdfe+Tmax (533.4 ns<t<666.7 ns) after measuring the total voltage $V_A$.

Figure 6:
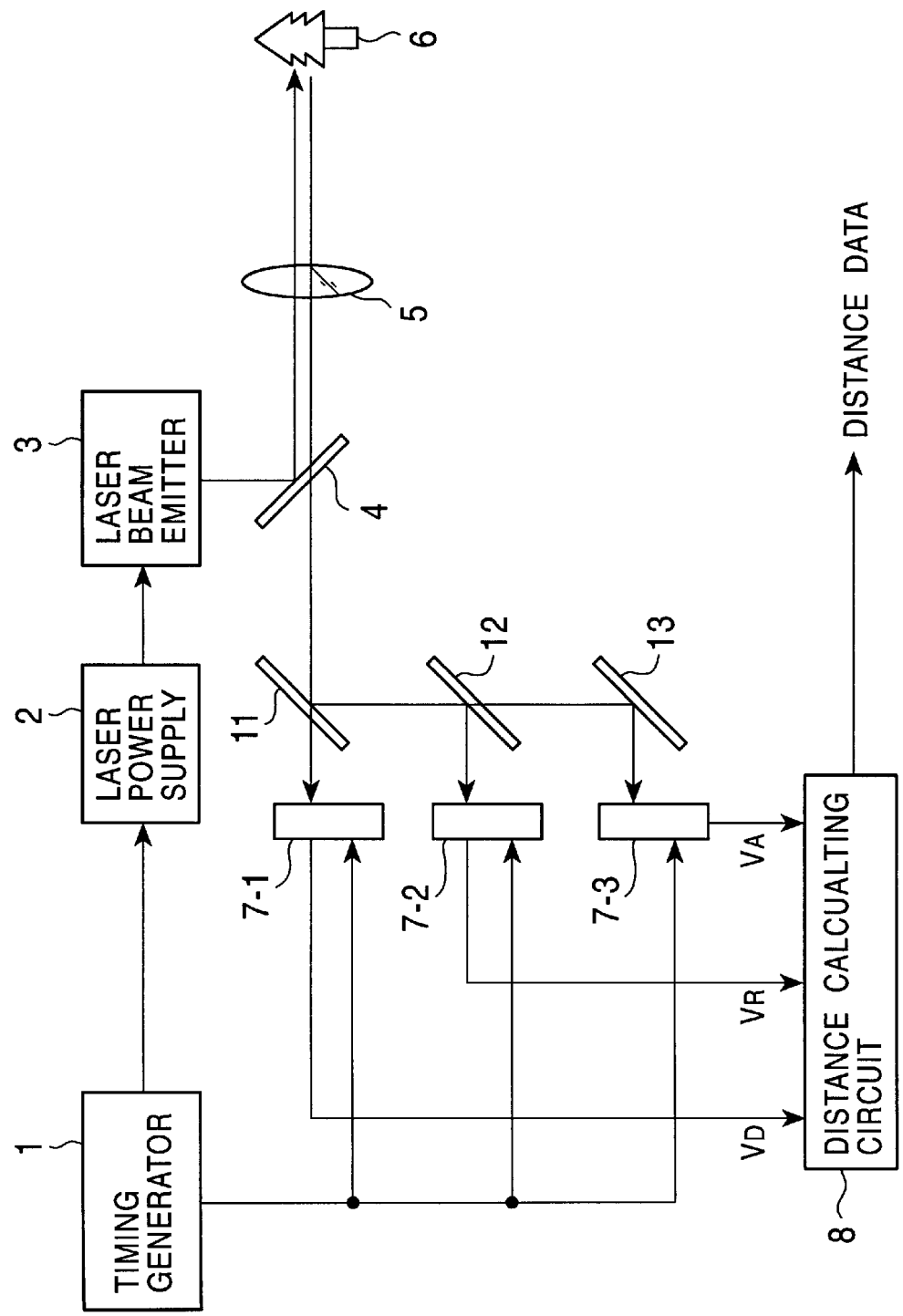
FIG. 6 is a block diagram showing a construction of another laser telemeter.

The laser telemeter shown in FIG. 1 takes a time to execute a sequence of necessary processes because, as described above, the laser beam must be emitted twice for one cycle of distance measurement and the single CCD 7 is used to successively receive the reflected beams at the respective timings for generating the dark voltage $V_D$, the reflection voltage $V_R$ and the total voltage $V_A$. The laser telemeter shown in FIG. 1 is able to precisely measure the distance to the object 6 not moving, but has a difficulty in precisely measuring the distance to a moving object. In view of such a point, a laser telemeter shown in FIG. 6 is intended to shorten a time required for the optoelectronic conversion and achieve precise measurement of the distance to a moving object by providing separate CCDs to generate the dark voltage $V_D$, the reflection voltage $V_R$ and the total voltage $V_A$, respectively. In the laser telemeter shown in FIG. 6, parts corresponding to those in the laser telemeter shown in FIG. 1 are denoted by the same numerals and are not described here.

CCDs 7-1 to 7-3 operate their electronic shutters at the proper timings under control of the timing generator 1, and convert the amounts of reflected beams, which enter the CCDs respectively through a beam splitter 11, a beam splitter 12 and a mirror 13, into electric signals (voltages), followed by outputting the electric signals to the distance calculating circuit 8. For example, the CCD 7-1 generates the dark voltage $V_D$, the CCD 7-2 generates the reflection voltage $V_R$, and the CCD 7-3 generates the total voltage $V_A$.

The distance calculating circuit 8 calculates the distance from the laser telemeter to the object 6 using the dark voltage $V_D$, the reflection voltage $V_R$, and the total voltage $V_A$ which are inputted respectively from the CCDs 7-1 to 7-3.

Figure 7:
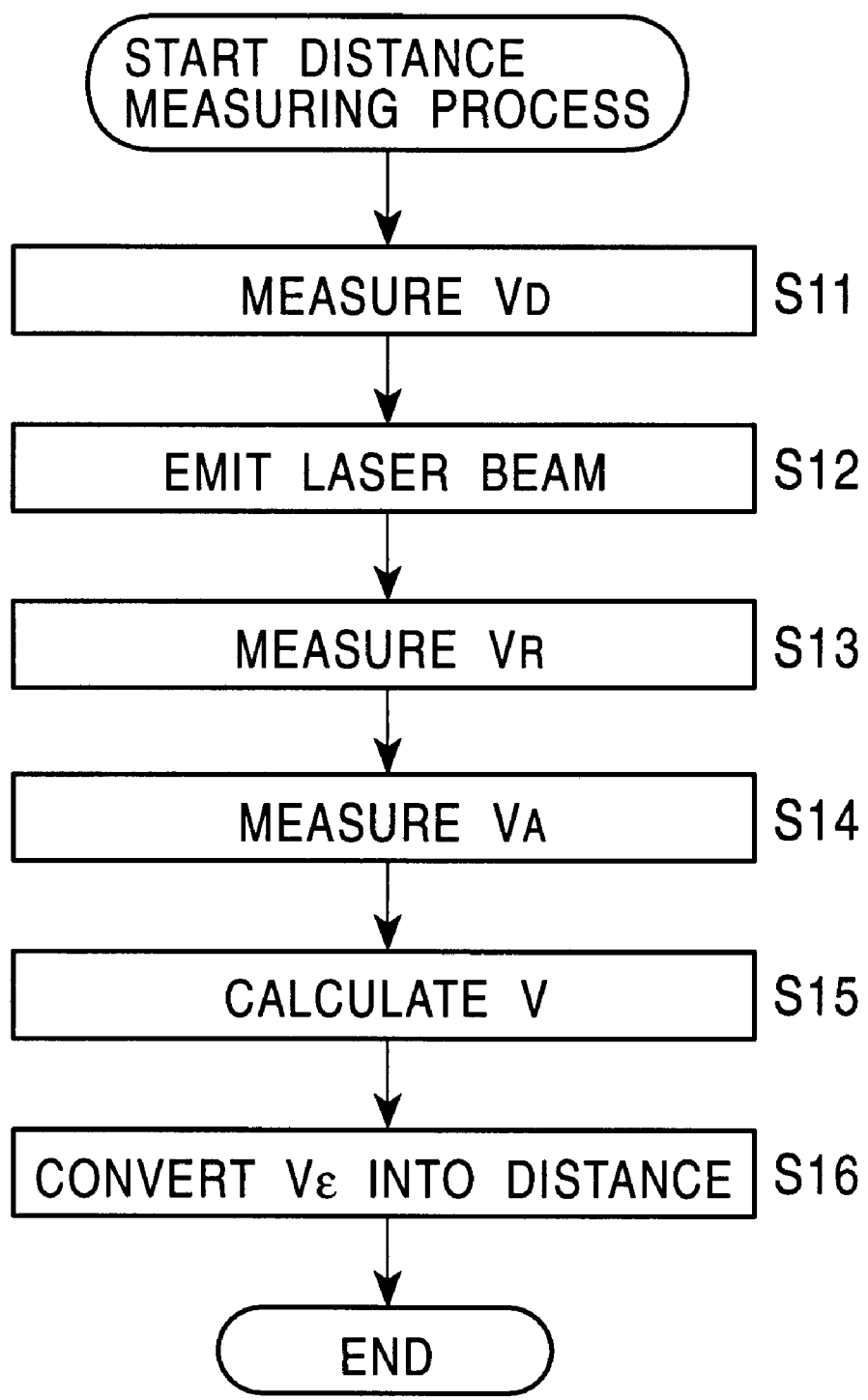
FIG. 7 is a flowchart for explaining the operation of the laser telemeter shown in FIG. 6.

The distance measuring process executed by the laser telemeter of FIG. 6 will be next described with reference to a flowchart of FIG. 7. When the user sets the laser telemeter toward the object 6 to be measured for the distance to the same and instructs the start of measurement, a dark voltage $V_D$ is measured in step S11 for use in compensation of the effect due to environment light other than the laser beam. More specifically, as shown in FIG. 8, the CCD 7-1 opens the shutter under control of the timing generator 1 for a period of –Tmax<t<0 (–133.3 ns<t<0), converts the amount of light received during that period through the lens 5, the beam splitter 4 and the beam splitter 11 into a dark voltage $V_D$, and then outputs the dark voltage $V_D$ to the distance calculating circuit 8.

In step S12, the timing generator 1 controls the laser power supply 2 and supplies power to the laser beam emitter 3. As shown in FIG. 8, the laser beam emitter 3 emits a laser beam during a period of 0<t<Tl (0<t<66.7 ns). The laser beam is reflected by the beam splitter 4 and irradiated to the object 6 through the lens 5. The laser beam reflected by the object 6 returns to the beam splitter 4 through the lens 5, and then enters the CCD 7-2 after passing the beam splitter 4 and being reflected by the beam splitters 11, 12. Also, a part of the reflected beam enters the CCD 7-3 after passing the beam splitter 12 and being reflected by the mirror 13. A period during which the reflected beam enters each of the CCDs 7-2 and 7-3 is the predetermined period Tl (66.7 ns) within the range of Tdns<t<Tdfe (133.3 ns<t<266.7 ns).

Figure 8:
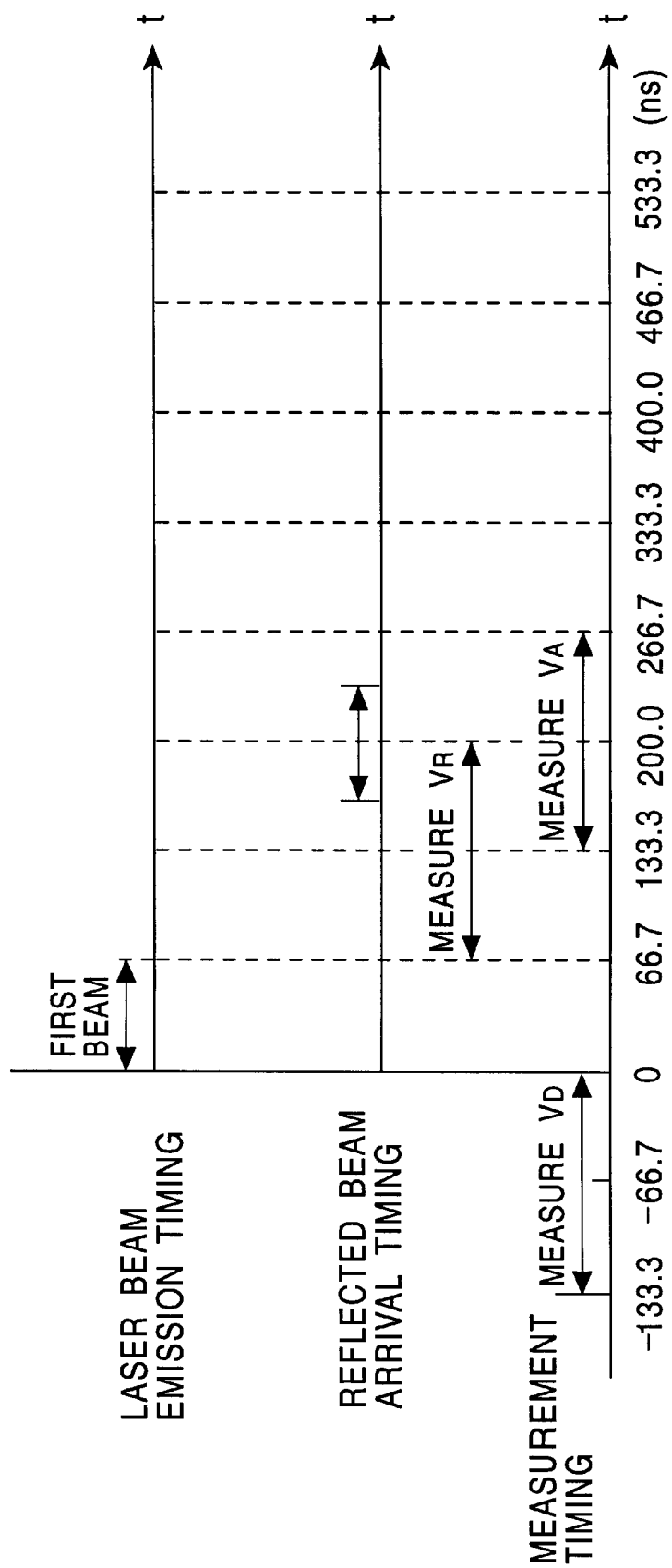
FIG. 8 is a chart for explaining the operation of the laser telemeter shown in FIG. 6.

In step S13, under control of the timing generator 1, the CCD 7-2 opens the shutter during a period of Tdfs–Tl<t<Tdfs (66.7 ns<t<200.0 ns), as shown in FIG. 8. Accordingly, the amount of light received by the CCD 7-2 corresponds to the position of the object 6. Then, the CCD 7-2 converts the amount of light received during that period into an electric signal (reflection voltage $V_R$), and outputs the reflection voltage $V_R$ to the distance calculating circuit 8.

In step S14, under control of the timing generator 1, the CCD 7-3 opens the shutter during a period of Tdfs<t<Tdfe (133.3 ns<t<266.7 ns), as shown in FIG. 8. Accordingly, the CCD 7-3 receives all of the laser beam reflected by the object at any timing, i.e., at any position within the measurement range. Then, the CCD 7-3 converts the amount of light received during that period into an electric signal (total voltage $V_A$), and outputs the total voltage $V_A$ to the distance calculating circuit 8.

In steps S15 and S16, as with the case of FIG. 1, the distance calculating circuit 8 calculates the distance D between the laser telemeter and the object 6 using the dark voltage $V_D$, the reflection voltage $V_R$ and the total voltage $V_A$.

Incidentally, the measurement of the dark voltage $V_D$ in step S11 may be performed during a period of Tdfe<t<Tdfe+Tmax (266.7 ns<t<400.0 ns) after measuring the total voltage $V_A$.

Also, if the CCD 7-2 or 7-3 is adaptable to execute the optoelectronic conversion twice successively, the CCD 7-1 can be dispensed with while the CCD 7-2 or 7-3 is used to measure the dark voltage $V_D$ as well.

Figure 9:
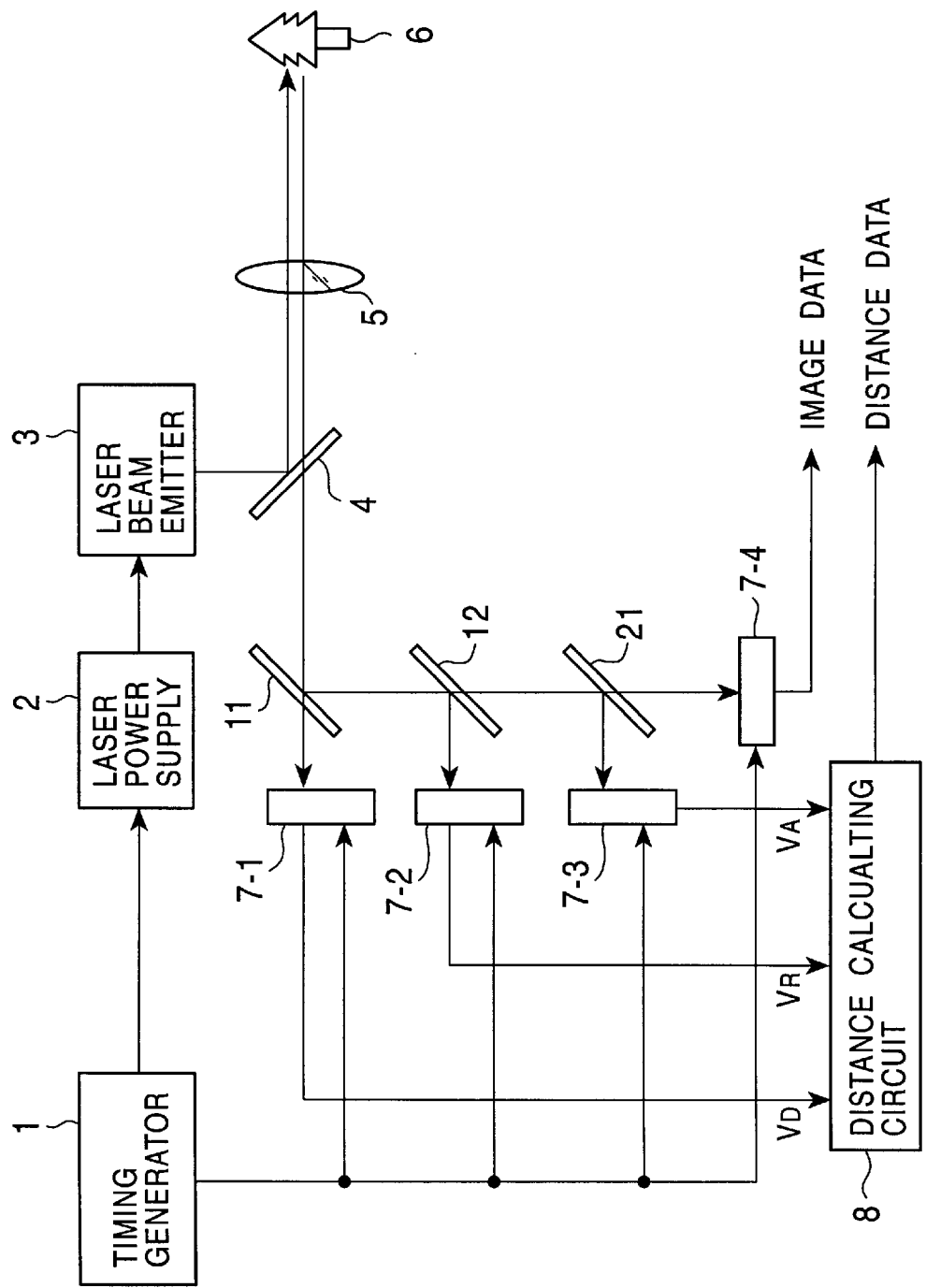
FIG. 9 is a block diagram showing a construction of still another laser telemeter.

FIG. 9 shows a construction of still another laser telemeter to which the present invention is applied. In this laser telemeter, the mirror 13 in the later telemeter of FIG. 6 is replaced by a beam splitter 21, and a CCD 7-4 is added. The CCD 7-4 receives the reflected beam having passed the beam splitter 21, converts the received beam into an electric signal, and then output the electric signal as image data. With the addition of the CCD 7-4 outputting image data, an image of the object 6 and the distance for each of pixels constituting the image (i.e., the distance to a portion of the object 6 corresponding to each pixel) can be obtained.

While in the above embodiments a CCD is employed as a device for receiving the reflected beam, any type of device can be used so long as it can receive light and converts the received light into an electric signal. For example, a light receiving device comprising a CMOS sensor is also usable in the present invention.

Further, while in the above embodiments an electric shutter is employed to perform light reception control of a light receiving device, any type of shutter can be used so long as it can control incidence of light upon the light receiving device. For example, an optical shutter is also usable in the present invention. Examples of the optical shutter includes an image intensifier and a polarization shutter. The image intensifier is a kind of photomultiplier which converts incident light into electrons through the optoelectronic conversion, accelerates the electrons by applying a voltage across a device (called a microchannel plate) comprising an assembly of thin pipes through which the electrons pass, and converts the electrons into light again. The image intensifier is originally developed for the purpose of amplifying dark light to bright light, but it can also be used as an optical shutter by rapidly switching over a high voltage applied to the microchannel plate. The polarization shutter is a shutter utilizing the Pockels effect or Kerr effect. By utilizing such a property of crystal as causing double refraction when subject to an electric field, the crystal can be used as an optical shutter by arranging polarizing plates with different phases in front and rear of the crystal and applying an electric field to it.

In the above embodiments, the reflected beam is received by opening the shutter in the front half of all the period during which the reflected beam possibly returns from the measurement range, i.e., within the time range of Tdns<t<Tdfs. It is however also possible to receive the reflected beam during a latter-half period of Tdne<t<Tdfe and calculate the distance based on the amount of light received during that period.

With the embodiment of FIG. 9, since the distance for each of pixels covering an irradiation area of the laser beam can be determined by one cycle of distance measurement, three-dimensional distance information of the object 6 can be obtained by spreading the irradiation area of the laser beam with no need of scanning the laser beam.

Additionally, a computer program for executing the above-described processes can be provided to users not only as offerable media in the forms of information recording media such as magnetic disks and CD-ROMs, but also via network media such as the Internet and digital satellite networks.

With the laser telemeters according to the embodiments, as described above, a signal resulted from receiving a laser beam reflected by an object during a predetermined period is normalized with a signal resulted from receiving a laser beam reflected by the object at any timing, i.e., at any position within the measurement range, and the distance to the object is calculated using the normalized signal. As a result, the distance to the object can be precisely measured.

What is claimed is:

1. A distance measuring apparatus for measuring the distance to an object using a laser beam, comprising:
   laser beam emitting means for emitting a laser beam;
   light receiving means comprising at least one light receiving device for receiving the laser beam reflected by the object;
   control means for controlling said laser beam emitting means to emit the laser beam, and controlling said light receiving means to receive the laser beam reflected by the object during a first period of time and to receive the laser beam reflected by the object during a second period of time; and
   calculating means for producing a measured value corresponding to the amount of light received during the first period of time and a reference value corresponding to the amount of light received during the second period of time, normalizing the measured value with the reference value, and calculating the distance to the object based on the normalized measured value.

2. A distance measuring apparatus according to claim 1, wherein said control means controls said light receiving means to receive environment light during a third period of time in which the laser beam reflected by the object is not received by said light receiving means; and
   said calculating means produces a environment light value corresponding to the amount of environment light received by said light receiving means, and compensates the measured value with the reference value based on the environment light value.

3. A distance measuring apparatus according to claim 2, wherein said light receiving means comprises a plurality of light receiving devices; and
   said control means controls said laser beam emitting means to emit the laser beam, then controls a first light receiving device to receive the laser beam reflected by the object during the first period of time, controls a second light receiving device to receive the laser beam reflected by the object during the second period of time partly overlapping with the first period of time, and controls a third light receiving device to receive environment light during a third period of time in which the laser beam reflected by the object is not received by said light receiving means.

4. A distance measuring apparatus according to claim 1, wherein said light receiving means comprises a single light receiving device; and
   said control means controls said laser beam emitting means to emit a first laser beam, then controls said single light receiving device to receive the first laser beam reflected by the object during the first period of time, thereafter controls said laser beam emitting means to emit a second laser beam, then controls said single light receiving device to receive the second laser beam reflected by the object during the second period of time.

5. A distance measuring apparatus according to claim 1, wherein said light receiving means comprises a plurality of light receiving devices; and
   said control means controls said laser beam emitting means to emit the laser beam, then controls a first light receiving device to receive the laser beam reflected by the object during the first period of time, and controls a second light receiving device to receive the laser beam reflected by the object during the second period of time partly overlapping with the first period of time.

6. A distance measuring apparatus according to claim 1, wherein said light receiving means receives image information of the object as well.

7. A distance measuring apparatus according to claim 6, wherein said light receiving means comprises a plurality of light receiving devices, and receives the image information by a light receiving device independently of light receiving devices for receiving the reflected beam during the first and second periods of time.

8. A distance measuring apparatus according to claim 1, wherein said control means controls said light receiving means so that a maximum time length in which the reflected beam is receivable during the first period of time is equal to or shorter than a maximum time length in which the reflected beam is receivable during the second period of time.

9. A distance measuring apparatus according to claim 8, wherein the first and second periods of time have the same duration.

10. A distance measuring apparatus according to claim 1, wherein said control means controls said laser beam emitting means to emit the laser beam for a time equal to or longer than the time required for the laser beam to go and return through a measurement range.

11. A distance measuring method for measuring the distance to an object using a laser beam, comprising the steps of:

a laser beam emitting step of controlling a laser beam emitting unit to emit a laser beam;

a first light receiving step of making control to receive the laser beam reflected by the object during a first period of time by a light receiving unit comprising at least one light receiving device;

a second light receiving step of making control to receive the laser beam reflected by the object during a second period of time by said light receiving unit; and a calculating step of producing a measured value corresponding to the amount of light received during the first period of time and a reference value corresponding to the amount of light received during the second period of time, normalizing the measured value with the reference value, and calculating the distance to the object based on the normalized measured value.

12. A distance measuring method according to claim 11, further comprising a third light receiving step of making control to receive environment light by said light receiving unit during a third period of time in which the laser beam reflected by the object is not received in said light receiving steps, wherein said calculating step produces a environment light value corresponding to the amount of environment light received by said light receiving unit, and compensates the measured value with the reference value based on the environment light value.

13. A distance measuring method according to claim 12, wherein said first light receiving step makes control, after the laser beam has been emitted in said laser beam emitting step, to receive the laser beam reflected by the object during the first period of time by a first light receiving device constituting said light receiving unit;

said second light receiving step makes control to receive the laser beam reflected by the object during the second period of time partly overlapping with the first period of time by a second light receiving device constituting said light receiving unit; and said third light receiving step makes control to receive the environment light by a third light receiving device constituting said light receiving unit during the third period of time in which the laser beam reflected by the object is not received in said light receiving steps partly overlapping with the first period of time.

14. A distance measuring method according to claim 11, wherein said first light receiving step makes control, after a first laser beam has been emitted in said laser beam emitting step, to receive the first laser beam reflected by the object during the first period of time by a single light receiving device constituting said light receiving unit;

said second light receiving step makes control, after a second laser beam has been emitted in said laser beam emitting step, to receive the second laser beam reflected by the object during the second period of time by a second light receiving device constituting said light receiving unit.

15. A distance measuring method according to claim 11, wherein said first light receiving step makes control, after the laser beam has been emitted in said laser beam emitting step, to receive the laser beam reflected by the object during the first period of time by a first light receiving device constituting said light receiving unit; and said second light receiving step makes control to receive the laser beam reflected by the object during the second period of time partly overlapping with the first period of time by a second light receiving device constituting said light receiving unit.

16. A distance measuring method according to claim 11, further comprising an image-information light receiving step of receiving image information of the object by a light receiving device independently of light receiving devices for receiving the reflected beam during the first and second periods of time.

17. A distance measuring method according to claim 11, wherein a maximum time length in which the reflected beam is receivable during the first period of time is equal to or shorter than a maximum time length in which the reflected beam is receivable during the second period of time.

18. A distance measuring method according to claim 17, wherein the first and second periods of time have the same duration.

19. A distance measuring method according to claim 11, wherein said laser beam emitting step controls said laser beam emitting unit to emit the laser beam for a time equal to or longer than the time required for the laser beam to go and return through a measurement range.

* * * * *